United States Patent [19]

Bauer

[11] Patent Number: 5,412,619

[45] Date of Patent: *May 2, 1995

[54] THREE-DIMENSIONAL DISPLACEMENT OF A BODY WITH COMPUTER INTERFACE

[76] Inventor: Will Bauer, 11514-77 Ave., Edmonton, Alberta, Canada, T6G 0M1

[*] Notice: The portion of the term of this patent subsequent to May 25, 2010 has been disclaimed.

[21] Appl. No.: 227,456

[22] Filed: Apr. 14, 1994

[51] Int. Cl.⁶ .............................................. G01S 3/80
[52] U.S. Cl. ................................. 367/128; 367/907
[58] Field of Search ............... 367/907, 128; 178/18; 84/626; 364/516

[56] References Cited

U.S. PATENT DOCUMENTS

5,073,685 12/1991 Kobayashi et al. ................ 367/907
5,214,615 5/1993 Bauer ................................. 367/907

Primary Examiner—Daniel T. Pihulic
Attorney, Agent, or Firm—Jane Parsons

[57] ABSTRACT

A system is provided for tracking the three-dimensional position of an object within a three-dimensional region by triangulation techniques to generate signals corresponding to such three-dimensional positions. The signals may be used to operate a variably operable system to create a virtual reality system. The triangulation means may comprise at least three ultrasound emitters cooperating with ultrasound receivers located on a body moving in the three-dimensional region. The signals are produced from multiplexed frequencies and/or intermediate signals may be projected using a triaxial accelometer.

17 Claims, 5 Drawing Sheets

THREE-DIMENSIONAL DISPLACEMENT OF A BODY WITH COMPUTER INTERFACE

BACKGROUND OF THE INVENTION

1. Field of the Invention

This invention relates to a control system for controlling the production of signals in response to three-dimensional movement, for example, to a system for producing sound in response to movement of a body in three-dimensional space. The invention especially relates to the control of variably operable apparatus such as stage lighting, slide projectors, video projectors and, especially to the conversion of movement of a body to make music. The invention also relates to the control of variably operable equipment such as computer interfaces with virtual reality systems.

2. Acknowledgement of Prior Art

U.S. Pat. Nos. 5,107,746 issued to Will Bauer on Apr. 28, 1992 and 5,214,615 issued to Will Bauer on May 25, 1993 describe and claim control systems of this type. The systems of these patents relate to systems for control of a music synthesizer by movement in three-dimensional space and to systems for the control of other variably operable equipment.

Briefly, those patents relate to the generation of a control signal in response to positional data derived from triangulation calculations based on the time taken for pulses of ultrasound to travel from spaced apart fixed transmitters to a moving object. The systems of those patents would be capable of finer control if there were greater positional sampling speed and additional input from alternate sensors. The present inventor has addressed this problem.

SUMMARY OF THE INVENTION

This invention relates to improved acoustic positioning sampling rates and the hybridization of the sensors so that additional information, both positional and otherwise, may be processed to generate improved control structures for the aforementioned media devices, virtual reality computer equipment, and variably operable equipment.

According to the invention there is provided a control system for operation in real time of a variably operable system in response to movement of at least one moving object in a three dimensional region, comprising;
- at least three, preferably four, ultrasound emitters located respectively at inertial reference points for triangulation determination of three-dimensional positions of said at least one object;
- pulse generator means to provide pulses of at least first and second prechosen frequencies to respective ones of the ultrasound emitters for generation of corresponding ultrasound pulses;
- a plurality of spaced apart receiving stations for each object, each receiving station comprising an ultrasound receiver and a pulse detector associated therewith to detect pulses received by the ultrasound receiver, each receiving station being associated with said object to move in a three-dimensional space with the object;
- an encoder associated with each receiving station to encode pulse arrival times into a form suitable for radio transmission;
- a radio transmitter for signals corresponding to the pulse arrival times;
- a radio receiver remote from said at least one object and from the radio transmitter to receive encoded signals from the radio transmitter;
- a decoder to decode signals from the radio receiver;
- an object tracking microprocessor controller for receiving said data from each ultrasound receiver associated with said at least one object, for computing a three-dimensional position of at least one object in terms of radial positional data for said at least one object, velocity, and acceleration of the object and, on the one hand, generating commands for the pulse generator for the ultrasound emitters, and, on the other hand, interfacing with a computer for generating commands in response to the computed three-dimensional positions, velocities and accelerations of the object and from the radial positional data for each ultrasound receiving station of said at least one object to control variations of said variably operable system.

The variably operable system may be a virtual reality system, a music synthesizer, or other variably operable apparatus.

Also according to the invention there is provided a control system for operation in real time of a variably operable system in response to movement of at least one moving object in three dimensional region, comprising;
- at least three, preferably four, ultrasound emitters located respectively at inertial reference points for triangulation determination of three-dimensional positions of said at least one object;
- a pulse generator to provide pulses to the ultrasound emitters for generation of corresponding ultrasound pulses;
- a plurality of spaced apart receiving stations for each object, each receiving station comprising an ultrasound receiver and a pulse detector associated therewith to detect pulses received by the ultrasound receiver, each receiving station being associated with said object to move in a three-dimensional space with the object;
- a receiver tracking microprocessor controller to receive and digitize pulses from each receiving station and to measure the time of pulse arrival, to control the generation and timing of signals from the pulse generator, and to calculate from the elapsed time between the emission of a signal to the pulse generator and a detected pulse corresponding thereto from a respective receiving station, radial positional data for the respective receiver for each pulse therefrom;
- an encoder associated with the tracking microprocessor controller to encode pulse arrival times into a form suitable for radio transmission;
- a radio transmitter for encoded signals corresponding to the pulse arrival times;
- a radio receiver remote from said at least one object and from the radio transmitter to receive encoded signals from the radio transmitter;
- a decoder to decode signals from the radio receiver;
- a triaxial accelerometer to measure acceleration along each of these spatial axes from reference points defined by each received pulse;
- means to calculate interim positional data from said acceleration;
- an object tracking microprocessor controller for receiving data from each ultrasound receiver associated with said at least one object, and for receiving said interim positional data for computing a three-dimensional position of at least one object in terms of the radial positional data and the interim positional data for said at least one object, velocity, and acceleration of the object and, on the one hand, generating commands for the pulse generator for the ultrasound emitters, and, on the other hand, interfacing with a computer for generating commands in response to the computed three-dimensional positions, velocities and accelerations of the object and from the radial positional data for each ultrasound receiving station of said at least one object to control variations of said variably operable system.

BRIEF DESCRIPTION OF THE DRAWINGS

Embodiments of the invention will now be described by way of example with reference to the drawings, in which.

DETAILED DESCRIPTION OF A PREFERRED EMBODIMENT

Figure 1:
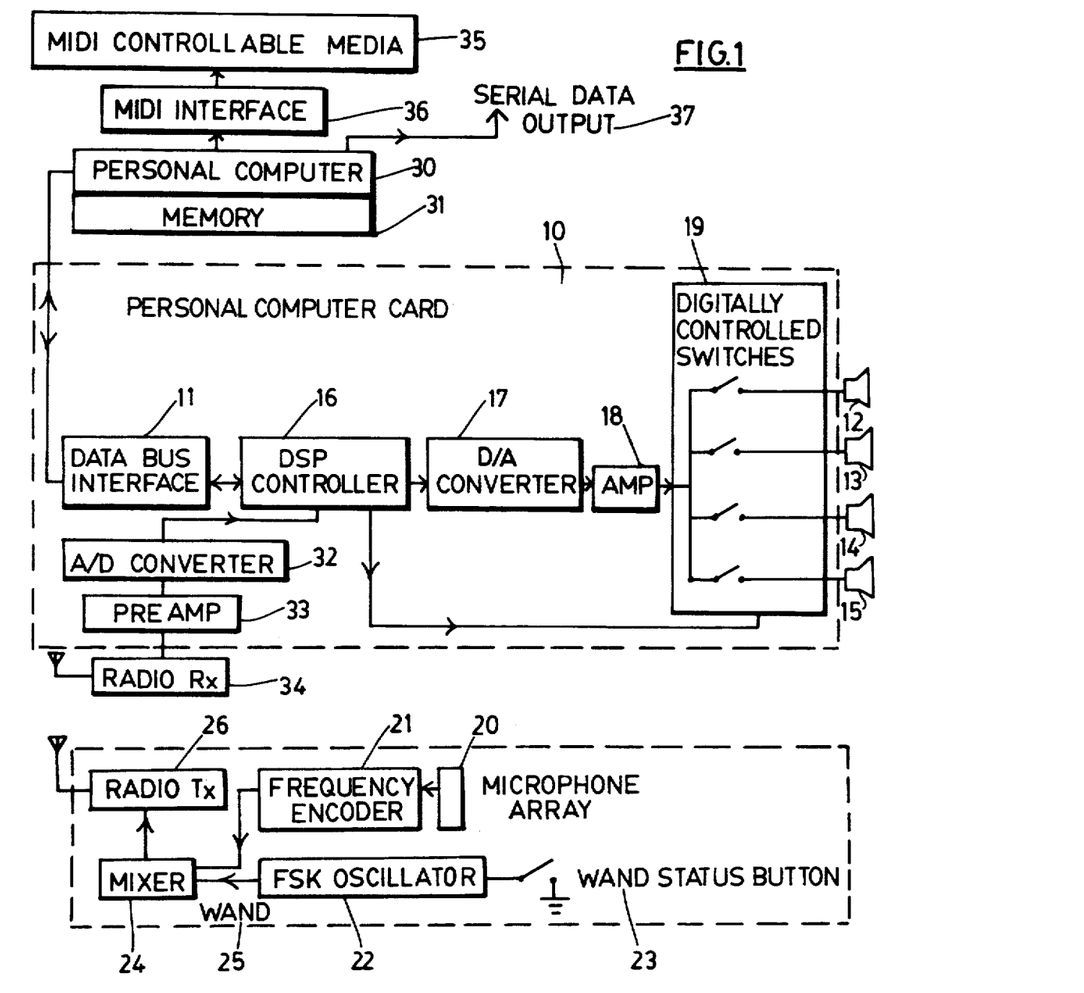
FIG. 1 is a block diagram of one system according to the invention.

FIG. 1 shows a digital signal processing (DSP) controller 16 which sends signals to each of speakers 12, 13, 14, and 15 causing them to emit repetitively a series of sound pulses which are multiplexed to provide a sampling rate greater than that possible using the systems of U.S. Pat. Nos. 5,107,746 and 5,214,615.

The multiplexed sound pulses may comprise a plurality, e.g. four pulses of different frequencies F1, F2, F3, and F4. Each pulse may be approximately 0.25 to 4 milliseconds duration. Each sound pulse F1, F2, F3, or F4 should be of sufficiently high frequency to be above the level of audible sound. A frequency range of 17 KHz to 60 KHz is suitable with each pulse of the series being well spaced from another within the range. The pulses may be generated by any suitable means, e.g. DSP controller 16 and digital to analogue (D/A) converter 17, which is capable of repetitively generating series of different pulses.

In systems described and claimed in U.S. Pat. Nos. 5,107,746 and 5,214,615 the sampling rate of the pulses of a single frequency was between 3 and 300 per second and was limited by the number of pulses transmitted and received per second. In practice, in those previous systems, pulses of a single ultrasonic frequency are emitted roughly every 32 milliseconds (ms). Thus the update rate of the position is limited to one new positional fix for every new pulse or about 32 updates per second (one update every 32 ms). When pulses of four separate frequencies are emitted and separately detected, the sampling rate is multiplied by four, allowing sampling rates of 128 Hz (4×32). Thus there would be one pulse every 8 ms or so with pulses of the same frequency still repeating every 32 ms. Even higher pulse rates may be possible by using pairs of frequencies to create additional categories of pulses. Thus a pulse consisting of frequency F1 followed about 0.1 ms later by frequency F2 would be different from one consisting of frequency F2 followed 0.1 ms later by frequency F3. The use of these two techniques: multiple frequencies and grouping of several frequencies staggered in time to comprise each pulse may allow for the sampling rate to be pushed higher, perhaps up to around 512 to 1024 Hz.

In FIG. 1, a DSP controller 16 functions as both pulse generator and detector for the system. Due to recent advances in DSP integrated circuit chip designs, it is now possible to perform relatively complex real-time signal processing tasks in the digital domain which, only a few years previously, would have required a large number of analog signal processing elements. This approach allows the design of hardware that is relatively simple and extremely flexible in its signal processing capabilities. The digital hardware can be reconfigured via firmware to perform a variety of different tasks allowing easy modification and extension of designs as the state of the art progresses.

Such is the case for the system shown in FIG. 1. All of the hardware elements comprising the pulse transmission and detection system can be realized on a single circuit board which can be inserted into a slot on the data bus of the personal computer 30. This allows for the possibility of several boards being inserted on the personal computer bus and being active in tracking several different wands at the same time. Additionally, given the right firmware algorithms and DSP clock speed, there is no reason why a single personal computer card 10 could not itself track several wands 25 simultaneously. FIGS. 1 through 5 show the case of a single wand for simplicity only.

The DSP controller 16 is a microprocessor capable of digitally generating pulse waveforms of the desired frequencies in a highly accurate and stable manner. These digital waveforms (sequences of digital numbers in the DSP microprocessor) are then converted to a physical analog waveform through a digital to analog (D/A) converter 17 which takes the sequence of numbers and generates voltages corresponding to the magnitude of the numbers. If this is done quickly enough, say at ten times the rate of the pulse frequency being synthesized, the result approaches very closely to a continuous analog waveform. This digital generation and conversion of pulse frequencies is well within the capability of a technician and is quite straightforward. An example of a chip which could function as the DSP controller is the TMS320C50 made by Texas Instruments while an example of a suitable D/A converter is the PCM56P made by Burr-Brown.

The frequency multiplexed pulses may be subjected to amplification by pulse amplification means 18, for respective speakers 12, 13, 14, and 15. The selection of which speaker receives a particular pulse may be carried out by solid state power switches 19 under the digital control of the DSP controller 16.

Figure 2:
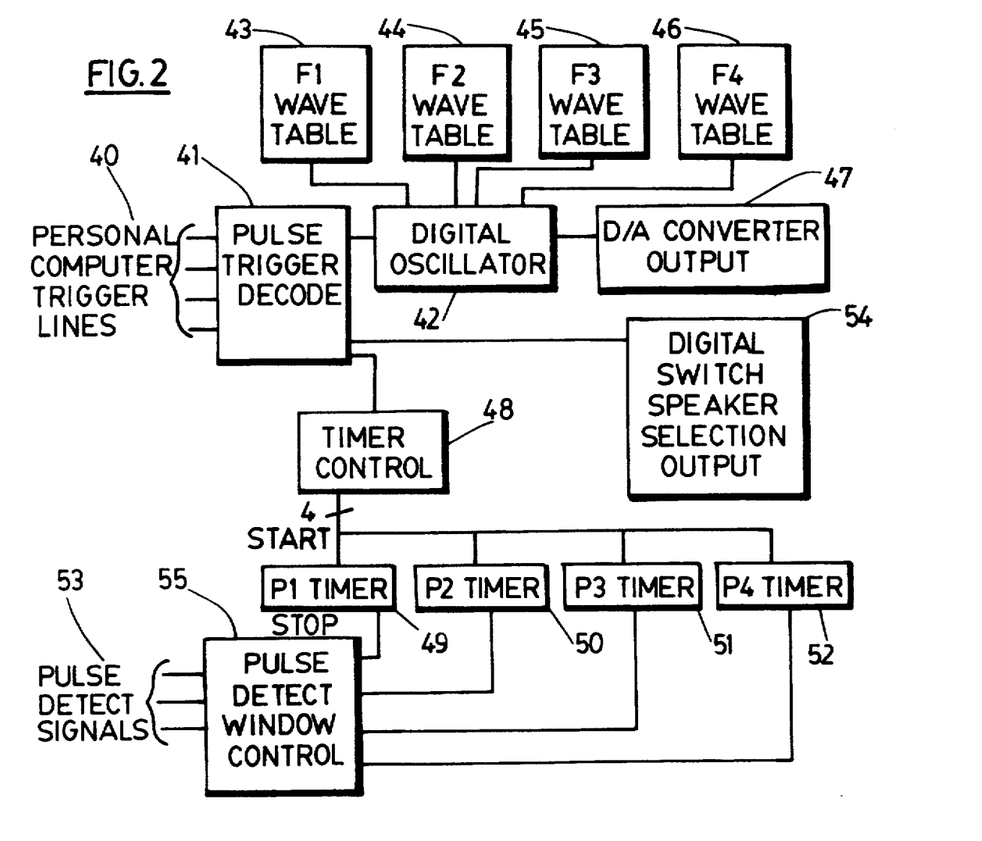
FIG. 2 is a block diagram of one possible pulse generation and timing method implemented in firmware for the system of FIG. 1.

FIG. 2 shows a block diagram of a possible firmware algorithm for generation and timing of pulses. The personal computer triggers the start of a pulse's generation, transmission, and reception frame by setting one of the personal computer trigger lines 40 high via a data bus interface 11 shown in FIG. 1. Following the trigger, a pulse trigger decode module 41 interprets the trigger signal to determine which frequency of pulse is to be generated and which speaker it should be routed to.

Next, a digital oscillator 42 uses wave-tables 43, 44, 45, and 46 to generate the correct pulse amplitude values at a speed of about ten times the pulse frequency. These values are sent digitally out of the DSP controller 16 via the D/A converter output 47 block to the D/A converter 17 where they are converted to analog voltage signals, amplified, and routed to the appropriate speaker. Control over speaker routing is determined by the digital switch speaker selection output lines 54. These are controlled by the DSP controller firmware to select the proper speaker for the pulse being generated. Once the pulse is fired, a software timer 49, 50, 51, or 52 is initialized through the timer control module 48 and begins to count the elapsed time until either the pulse is received (which generates a trigger signal on the pulse detect signals 53) or until it reaches a maximum count. If a pulse is detected on the pulse detect signals 53, it is up to the pulse detect window control module 55 to determine whether this pulse detection is legitimate or is an echo or other undesirable artifact. This is done by allowing pulses to arrive only within certain time "windows" which are determined by the personal computer 30 and sent to the DSP controller firmware through the data bus interface 11 (see FIG. 1). If the pulse detection falls within the appropriate time window, it is counted as valid and allowed to stop the timer in question. The pulse arrival time is transferred to the personal computer through a data bus interface 11 provided on the personal computer card 10.

Referring once again to FIG. 1, a human performer within the three-dimensional region may have a microphone array 20 attached to that part of the body subject to maximum movement. For example, the microphone array 20 could be located at or near one of the user's hands. Each microphone array 20 may be provided with a casing for discrete placing on a human body.

Within this casing may also be found other sensors 23 which, combined with the acoustic position measurements derived from the microphone array, enhance the level and quality of control which can be exerted over the media, computer, and variably operable systems being controlled. Examples of these sensors are angular sensors to detect the pitch, yaw, and roll orientation of the wand, a wand button which may function in a manner analogous to the button on a computer mouse, allowing accurate timing and demarcation of the start and stop of certain gestures, or a higher speed position sampling sensor such as a triaxial accelerometer which complements the acoustic position measurements. Other sensors are also possible, within the limitations of radio transmitter bandwidth and computer processing speed. Exemplary sensor 23 shown in FIG. 1 is a wand status button. However, it must be understood that any or all of the aforementioned additional sensors may be present in any combination within the wand, creating a hybrid sensor environment which greatly augments the capabilities of a wand based solely on acoustic position measurement.

Within the wand casing may also be found a frequency encoder 21, a frequency shift keyed (F.S.K.) oscillator 22 (which oscillates at one of two frequencies depending on the status of the wand status button 23), and a mixer 24. This assembly comprises a wand 25. The radio transmitter 26 may be included within the wand as shown or may be housed in a separate casing and connected by a cable to the wand 25. Additionally, the microphone array 20 may be mounted as shown within the wand casing or it can be housed separately, away the body of the wand 25 and connected to it via a cable.

An ultrasound pulse from any of speakers 12, 13, 14, and 15 will go to the wand's microphone array. Each pulse may be identified by reference to the frequency with which it is emitted.

The microphone array 20 is connected to a frequency encoder 21 which converts the pulse of frequency F1 into a form suitable to radio frequency modulation. Depending on the value of frequency F1, this conversion may be as simple as adjusting the amplitude of the pulse to a level suitable for transmission. Alternatively, conversion may consist of frequency shifting the pulse from its incoming frequency of F1 to another frequency more suitable to the radio link's bandwidth. Such transduction is quite simple once the concept of direct transmission of the pulse over the radio link is appreciated. The wand status button 23 which may be employed by the user to signal the start and stop of actions. Within the context of a three dimensional tracking system, the button functions in a similar manner to the "mouse" button found on two-dimensional computer "mice". The F.S.K. oscillator emits one of two frequencies continuously. These frequencies are usually much lower (in the range of 500 to 4000 Hz) than those used for any of the ultrasonic pulses so that there is no interference between the two. Thus, by detecting which F.S.K. frequency is being transmitted, the DSP controller 16 can determine whether the wand status button 23 is open or closed. The two signals—one from the F.S.K. oscillator and the other from the frequency encoder are mixed together by a mixer 24 and are then transmitted from the wand 25 to the DSP controller 16 via a radio transmitter 26.

The transmitted pulse arrives at the radio receiver 34, is amplified via a pre-amplifier 33 and is converted into digital form via an analog to digital (A/D) converter 32. This digital signal is then processed by the DSP controller 11 to detect the arrival of the ultrasonic pulses at the wand and calculate the time from their emission by the speakers to their reception.

Figure 3:
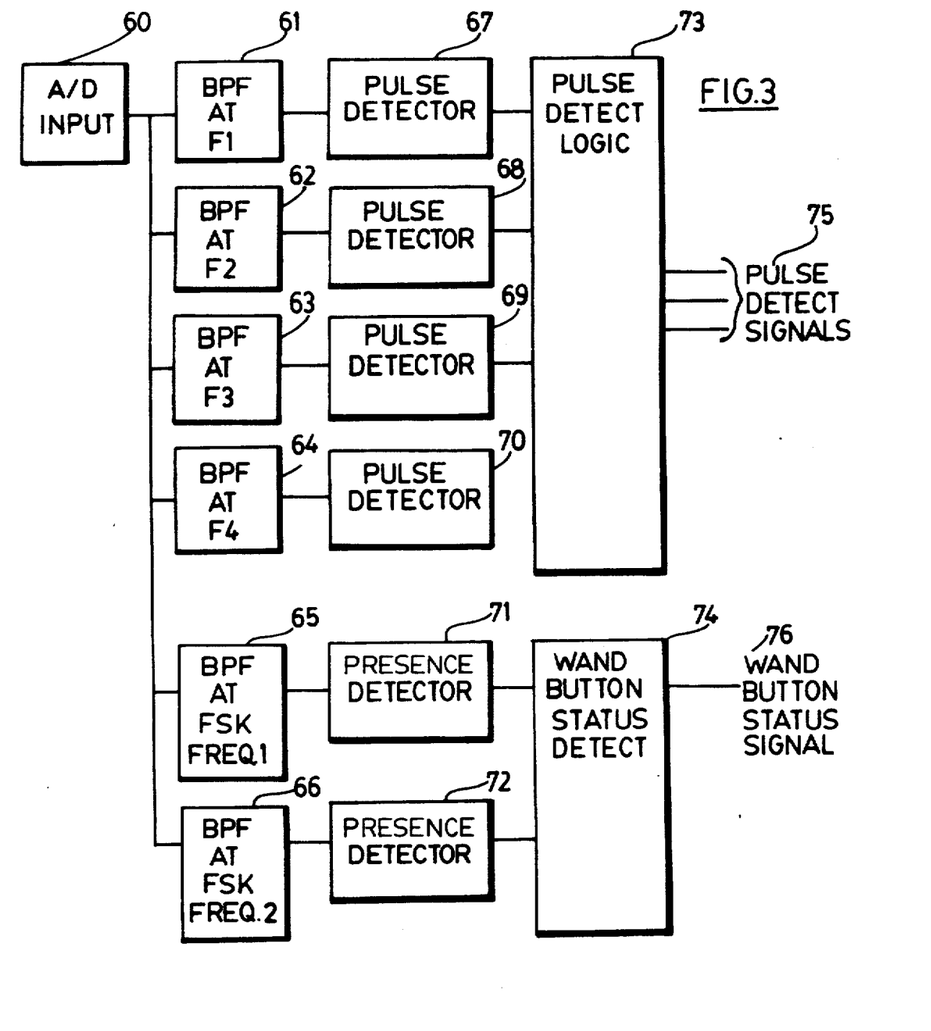
FIG. 3 is a block diagram of one possible pulse detection method implemented in firmware.

FIG. 3 shows a block diagram for a possible realization of the DSP controller pulse detection firmware. The digitized wand signal which, from the description with reference to FIG. 1, arrived from the wand 25 via the radio receiver 34, preamp 33, and A/D converter 32) arrives through the A/D input module 60 and is sent through a series of parallel digital band pass filter (BPF) modules 61, 62, 63, and 64. Each of these is centred at a particular frequency F1, F2, F3, or F4 respectively and serves to remove any pulses or noise not at the filter's centre frequency. These filters are fairly narrow, having a bandwidth of only a few KHz and a sharp transition between the pass band and rejection band of the filter. Each filtered output is then fed to a pulse detector module 67, 68, 69, and 70 which detects the presence of the pulse when it arrives and produces a binary indication of that arrival. The binary outputs of the pulse detector are fed to a pulse detection logic module 73 which is used to detect combinations of pulses (if that approach is being used). Thus for a case where a particular "pulse" consists of a pulse of frequency F1 followed 0.1 ms later by a pulse of frequency F2, the pulse detection logic module 73 would perform the necessary timing of the F1 and F2 pulses to ensure that the time delay between them was, in fact, correct. Only then would it generate a pulse detect signal 75 indicating that a valid pulse had arrived.

The detection of the wand button status is performed in a similar way to the pulse detection: the incoming wand signal is filtered by two parallel band pass filter (BPF) modules 65, 66 each centred at one of the two possible F.S.K. oscillator frequencies. Each filter output goes to a presence detector module 71, 72 which gives a binary indication of the presence of one of the two frequencies. The wand button status detector 74 takes the binary presence detector outputs and generates a trinary wand button status signal 76 depending on the wand button status detected. If the "button up" frequency is detected, the output changes to show that the button is indeed up. If the other frequency ("button down") is detected, the output changes to show that the button is down. If both frequencies are detected (a case that should not happen) the output remains unchanged in its previous state. If neither of the two frequencies are detected, the output is set to indicate that the wand cannot be detected at present and is either turned off or in the middle of a radio frequency "null" point where the wand's radio transmitter is (temporarily) not getting through to the receiver. This button status information plus the timing information gained by each pulse arrival is transferred to the personal computer 30 via the data bus interface 11 so that the personal computer software can make use of it.

Referring again to FIG. 1, the DSP controller 16 measures the amount of time that elapses between the emission and reception of a pulse of frequency F1. This time varies directly with the distance of each wand from the speaker and so gives a measurement of the distance between the two. This is done for each of the four speakers 12, 13, 14, and 15 producing four timing measurements for each wand 25. This information is used by the personal computer 30 to calculate the radial position of each wand relative to each speaker by applying an appropriate linear transformation to the time measurement. The relationship between pulse time of flight and distance can be approximated by a linear equation $$t = m*d + b$$

where t is the time of flight, m is a calibration multiplier, d is the distance travelled, and b is an offset quantity to account for transmission and pulse detection delays. Calculation of the values for m and b can be achieved by taking timing measurements at two or more known distances from a speaker and then solving for m and b as unknowns. Once established, this relationship is roughly constant assuming reasonably constant temperature, humidity, and air pressure so that only one calibration per session (or often less) is required. A program for running the controller 16 is straightforward once the concept of using high frequency sound as a locator means for a moving object is accepted.

Position indicating signals calculated from the transmission of a pulse of frequency F1 by the DSP controller 16 pass to computer means 30 which may suitably be a microcomputer of the personal computer type. Similarly, position indicating signals are calculated from the transmission of pulses of F2, F3, and F4. Given a fast enough computer (for example, an IBM AT clone 486 33 MHz system) it is possible to calculate in real-time the three dimensional position and to notice any changes in the status of the wand status button 23. This is possible because there is an interval of time between each incoming measurement based on the pulses of frequencies F1, F2, F3, and F4 respectively. During this time, the previous set of measurements can be processed and the positional and the wand button status updated.

The computer 30 is provided with software to enable the user to make a map of sub-regions of its memory 31 in which movement will take place in a similar manner to that described in U.S. Pat. No. 5,214,615 previously referred to. Additionally, software is provided which allows the structuring in time of a series of sub-region maps. Thus, one can follow a trajectory through time where different mappings are in effect at different times based on both the elapsed time and the status of the wand status button 23 on the wand.

The computer 30 is also provided with real-time processing software. The processing software allows interpretations of the movement, for example, musical interpretations, which depend on the current set of measurements of distance, velocity, and acceleration in each of the three spatial dimensions measured by the DSP controller 16 as a result of sound pulses of frequencies F1, F2, F3, and F4 from speakers 12, 13, 14, and 15 placed at the four reference locations.

Thus the entire system functions as a three dimensional tracking system which allows control of electronic media, computers, and other variably operable systems in real time.

Figure 4:
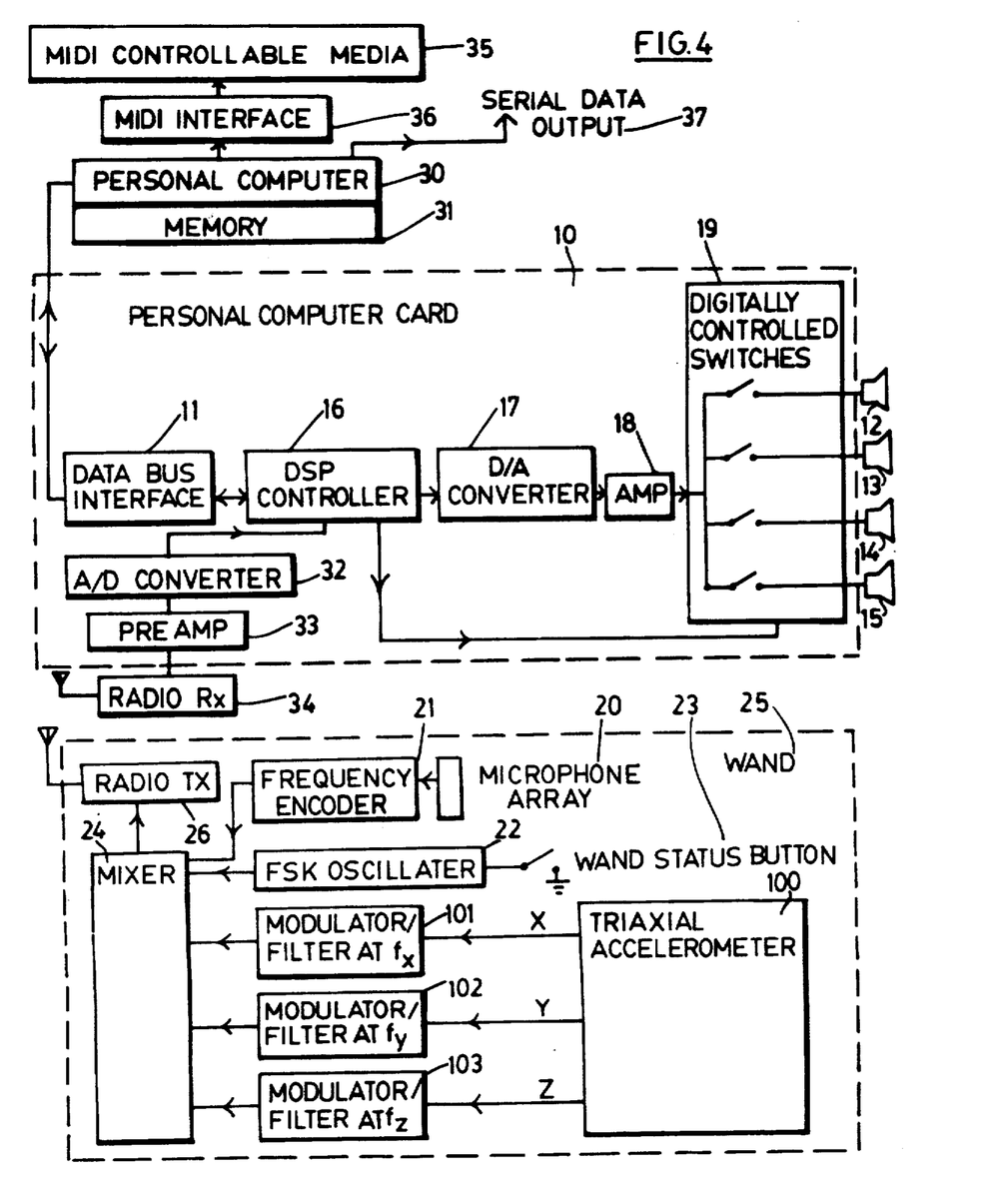
FIG. 4 is a block diagram of another embodiment of the invention.

The embodiment shown in FIG. 4 may be alternative or additional to the systems of FIGS. 1, 2, and 3. In the system of FIG. 4, the sampling rate of actual pulses is about 32 Hz and another sensor is used to fill in the gaps between successive acoustically-based position measurements. It is understood that while the sampling rate is about 32 Hz for single pulses, there is no reason why the additional sensor may not be used with multiplexed pulses. It is for simplicity that it is described with reference to a system utilizing a single pulse frequency.

A triaxial accelerometer 100 is incorporated into a system which is similar to that of FIG. 1 except that the pulse generator implemented by DSP controller 16 and D/A converter 17 generates pulses of only one frequency. Generally in FIG. 4, the reference numerals which are also used in FIG. 1 designate similar parts. The triaxial accelerometer is contained within the casing of the wand 25 together with the other sensors and associated equipment of the wand. The accelerometer 100 must be mounted in a rigid and fixed spatial relationship to the microphone array 20 which provides for the previously described method of position measurement in order that the two position measurements may be combined together into one overall position measurement. Analog voltages are output from the triaxial accelerometer for each of the three axes. These are output separately to analog modulators/filters 101, 102, and 103 which first band limit the signals and then frequency multiplex them so that they can be transmitted over the radio transmitter 26 without interfering with either the acoustic signals or the wand button status frequencies also being transmitted. Typically, the maximum frequencies of interest for accelerometer measurement are only a few hundred Hz so it is possible to multiplex the three accelerometer axis signals into the lower 1 or 2 KHz, leaving ample guard bands in between them. In this case, the wand button status oscillator would be allotted frequencies in the 2 to 3 KHz range, leaving plenty of bandwidth remaining for the ultrasonic pulse signals.

The outputs from the filter/modulators 101, 102, and 103 are then mixed with the other wand signals by the mixer 24 before being sent to the radio transmitter 26 to be transmitted to the DSP controller 16 where they can be evaluated. Data reception is the same as described for FIG. 1: signals from the radio receiver 34 are amplified by the preamp 33 and then digitized by the A/D converter 32 and passed in digital form to the DSP controller 16 for evaluation.

Figure 5:
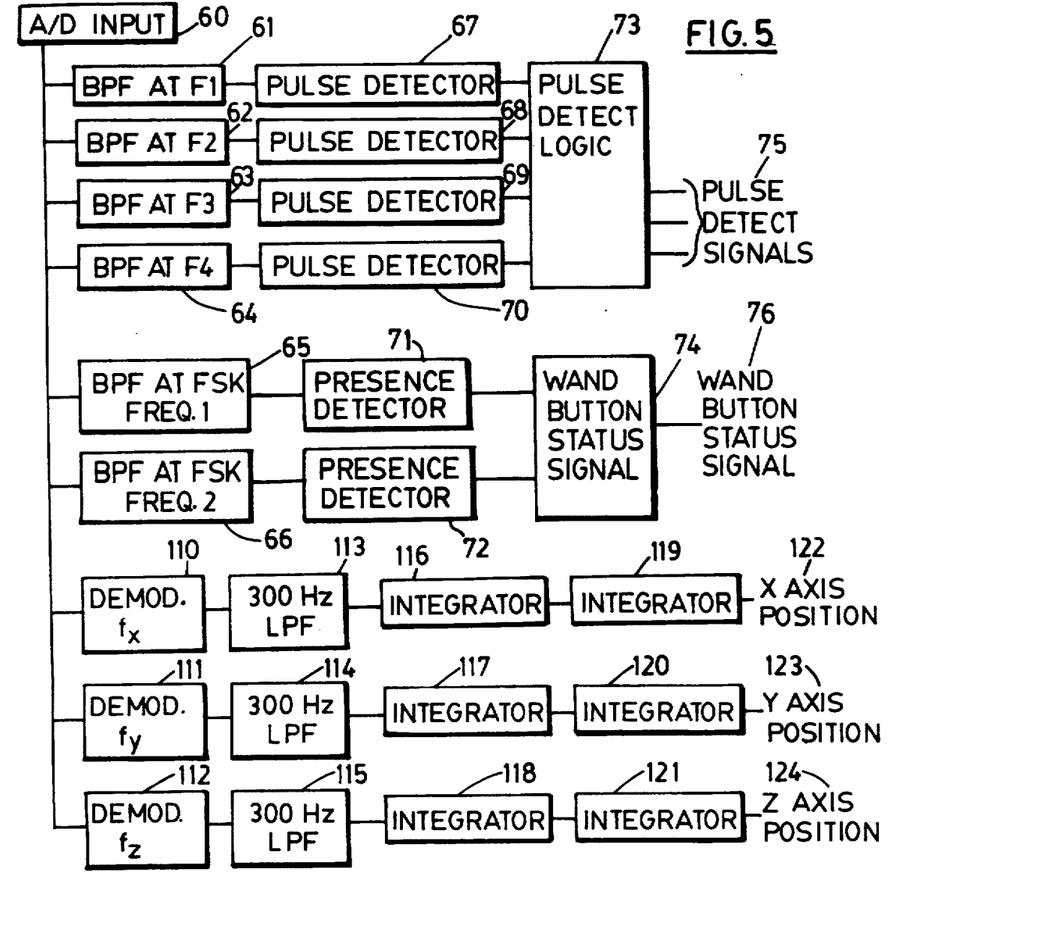
FIG. 5 is a block diagram of one possible pulse detection algorithm which might be implemented in firmware for the system of FIG. 4.

FIG. 5 shows a possible embodiment of firmware for the DSP controller which would deal with acoustic pulses and wand button status in exactly the same fashion as mentioned in the discussion of FIG. 1 but which also processes the accelerometer data. Accelerometer X, Y, and Z data are extracted via demodulator modules 110, 111, and 112 which shift each modulated signal back to baseband for each of the X, Y, and Z axis data respectively. Following this, three 300 Hz Low Pass Filters (LPF's) 113,114, and 115 remove the image frequencies generated by the frequency shifting resulting in completely demodulated X, Y, and Z axis acceleration signals. These signals are then integrated by integration modules 116, 117, and 118 to produce X, Y, and Z velocity values. These values are then integrated by integration modules 119, 120, and 121 to produce values for X, Y, and Z axis position 122, 123, and 124.

Referring once again to FIG. 4, these three values are then passed to the personal computer 30 via the data bus interface 11 for merging with the acoustically derived measurements. This task is performed by the personal computer software at the same time as it performs the three dimensional calculations for the acoustic data.

A triaxial accelerometer measures acceleration along each of the three spatial axes which define three dimensional space. This is done by use of three sensors, aligned along orthogonal axes, which convert acceleration into an electronic voltage. Some accelerometers may measure acceleration frequencies ranging from 0 to several hundred or several thousand Hz. Others may only measure acceleration frequencies starting at a non-zero lower frequency bound. It is the former that are required for this application. A number of manufacturers provide these sorts of accelerometers. An example of a suitable model is the Entran Devices EGA 125F-10D accelerometers with an Entran EGA-MTG triaxial mounting block. From the measurement of instantaneous acceleration along each of the three spatial axes, it is possible to calculate positional change in each of the three dimensions by integrating the acceleration values to compute 3D velocities and then integrating the velocities to compute 3D positional changes. Thus, from the accelerometer measurements, change in 3D position over a period of time relative to a known starting point may be calculated. The known starting point may be taken as the 3D position calculated from the most recent acoustic positioning pulse arrival. Of course, accelerometer measurements contain some error and, over time, these errors add up to the point where the 3D position predicted by the accelerations bears little resemblance to reality. However, periodic corrections are provided by a new "start point" as each new acoustic positioning system pulse is received. Thus, each acoustically generated position is a reference "start point". The accelerometer-based path is measured from this new 3D point until a new acoustic position becomes available and thus bridges in-between the acoustic position measurements.

One advantage of the use of positions calculated via triaxial accelerometer concerns the possibility of missing reception of an acoustic pulse if the acoustic system becomes blocked briefly, possibly by the user's body, and is unable to generate a new position. Using a system which incorporates the accelerometer, the system continues functioning with only a slow degradation in positional accuracy until a new acoustic fix becomes possible.

A triaxial accelerometer/acoustic hybrid system as described above will provide an improvement in position sampling rate so that rates of up to several thousand Hz are possible. In this case, the sampling rate will be limited by computer calculation speeds rather than by the physics of acoustic phenomenon.

It should be noted that, for simplicity, the accelometer has been described with reference to the processing of single frequency pulses. It is quite possible however that the triaxial accelometer may be utilized when processing pulses of multiple frequencies e.g. F1, F2, F3 and F4.

I claim:

1. A control system for operation in real time of a variably operable system in response to movement of at least one moving object in a three dimensional region, comprising;

at least three ultrasound emitters located respectively at inertial reference points for triangulation determination of three-dimensional positions of said at least one object;

pulse generator means to provide pulses of at least first and second prechosen frequencies to respective ones of the ultrasound emitters for generator of corresponding ultrasound pulses;

a plurality of spaced apart receiving stations for each object, each receiving station comprising an ultrasound receiver and a pulse detector associated therewith to detect pulses received by the ultrasound receiver, each receiving station being associated with said object to move in a three-dimensional space with the object;

an encoder associated with the receiving station to encode pulse arrival times into a form suitable for radio transmission;

a radio transmitter for encoded signals corresponding to the pulse arrival times;

a receiver tracking microprocessor controller to receive and digitize pulses from each receiving station and to measure the time of pulse arrival, to control the generation and timing of signals from the pulse generator, and to calculate from the elapsed time between the emission of a pulse of one of the prechosen frequencies to the pulse generator and a detected pulse corresponding thereto from a respective receiving station, radial positional data for the respective receiver for each pulse therefrom;

a radio receiver remote from said at least one object and from the radio transmitter to receive signals from the radio transmitter;

a decoder to decode signals from the radio receiver;

an object tracking microprocessor controller for receiving data for each ultrasound receiver associated with said at least one object, for computing a three-dimensional position of at least one object in terms of radial positional data for said at least one object, velocity, and acceleration of the object and, on the one hand, generating commands for the pulse generator for the ultrasound emitters, and, on the other hand, interfacing with a computer for generating commands in response to the computed three-dimensional positions, velocities and accelerators of the object and from the radial positional data for each ultrasound receiving station of said at least one object to control variations of said variably operable system.

2. A system as claimed in claim 1 in which four ultrasound emitters are used.

3. A system as claimed in claim 1 in which the variably operable system is a virtual reality system.

4. A system as claimed in claim 1 in which the variably operable system is variably operable apparatus.

5. A system as claimed in claim 1 in which the variably operable system is a music synthesizer.

6. A system as claimed in claim 1 in which the ultrasound has a frequency in the range of from 17 KHz to 60 KHz.

7. A system as claimed in claim 1 in which at least one object is attachable to a human body part.

8. A system as claimed in claim 7 in which more than one ultrasound receiver is present, an array of said receivers being included in each object.

9. A system for tracking at least one object within a three dimensional region comprising;
at least three ultrasound emitters located respectively at respective inertial reference points for triangulation determination of the three-dimensional position of said object;
pulse generator means to provide pulses of at least first and second prechosen frequencies to respective ones of the ultrasound emitters for generator of corresponding ultrasound pulses;
at least one ultrasound receiver associated with said object to move in the three-dimensional region;
a pulse detector associated with each ultrasound receiver to detect pulses thereby;
a pulse encoder to encode pulse arrival times from the receiver tracking microprocessor into a form suitable for radio transmission;
a radio transmitter associated with the encoder and a radio receiver remote from said object, the radio transmitter being adapted to transmit data corresponding to detected pulses to the radio receiver;
a radio receiver remote from at least one object and from the radio transmitter to receive encoded signals from the radio transmitter;
a pulse decoder associated with the radio receiver to decode transmitted pulses into a form suitable for microprocessor detection;
a microprocessor controller adapted to detect transmitted pulses from the decoder and to send signals to the ultrasound emitters to initiate emission of ultrasound pulses therefrom, to measure elapsed time between the emission of an ultrasound pulse from respective ultrasound emitters and a detected pulse corresponding thereto, to calculate radial positional data for the object from the elapsed times for pulses from each of the emitters to the object, and to generate position indicating signals; and
computer means interfaced with the microprocessor controller for receiving said position indicating signals therefrom, computing the three dimensional position, velocity, and acceleration of the object.

10. A control system for operation in real time of a variably operable system in response to movement of at least one moving object in three dimensional region, comprising;
at least three ultrasound emitters located respectively at inertial reference points for triangulation determination of three-dimensional positions of said at least one object;
a pulse generator to provide pulses to the ultrasound emitters for generator of corresponding ultrasound pulses;
a plurality of spaced apart receiving stations for each object, each receiving station comprising an ultrasound receiver and a pulse detector associated therewith to detect pulses received by the ultrasound receiver, each receiving station being associated with said object to move in a three-dimensional space with the object;
an encoder associated with the tracking microprocessor controller to encode pulse arrival times into a form suitable for radio transmission;
a radio transmitter for encoded signals corresponding to the pulse arrival times;
a radio receiver remote from said at least one object and from the radio transmitter to receive encoded signals from the radio transmitter;
a decoder to decode signals from the radio receiver;
a triaxial accelerometer to measure acceleration along each of three orthogonal spatial axes from reference points defined by each received pulse;
means to calculate interim positional data from said acceleration;
an object tracking microprocessor controller for receiving data for each ultrasound receiver associated with said at least one object, and for receiving said interim positional data for computing a three-dimensional position of at least one object in terms of radial positional data and the interim positional data for said at least one object, velocity, and acceleration of the object and, on the one hand, generating commands for the pulse generator for the ultrasound emitters, and, on the other hand, interfacing with a computer for generating commands in response to the computed three-dimensional positions, velocities and accelerators of the object and from the radial positional data for each ultrasound receiving station of said at least one object to control variations of said variably operable system.

11. A system as claimed in claim 10 in which four ultrasound emitters are used.

12. A system as claimed in claim 10 in which the variably operable system is a virtual reality system.

13. A system as claimed in claim 10 in which the variably operable system is variably operable apparatus.

14. A system as claimed in claim 10 in which the variably operable system is a music synthesizer.

15. A system as claimed in claim 10 in which the ultrasound has a frequency in the range of from 17 KHz to 60 KHz.

16. A system as claimed in claim 10 in which at least one object is attachable to a human body part.

17. A system as claimed in claim 16 in which more than one ultrasound receiver is present, an array of said receivers being included in each object.

* * * * *